United States Patent [19]

Mogensen et al.

[11] Patent Number: 5,250,476
[45] Date of Patent: Oct. 5, 1993

[54] CERAMIC BINDER AND USE THEREOF

[75] Inventors: Gurli Mogensen, Bjaeverskov, Denmark; Bruno Kindl, Peterborough, Canada

[73] Assignee: Haldor Topsoe A/S, Denmark

[21] Appl. No.: 867,751

[22] Filed: Apr. 13, 1992

[30] Foreign Application Priority Data

Apr. 30, 1991 [DK] Denmark .............................. 0806/91

[51] Int. Cl.[5] .............................................. C04B 35/02
[52] U.S. Cl. ................................... 501/94; 252/315.01; 264/86; 264/87; 264/302; 501/12; 501/95; 501/103; 501/104; 501/105; 501/108; 501/116; 501/123; 501/125; 501/126; 501/127; 501/132; 501/134
[58] Field of Search ............ 501/12, 94, 95, 103, 501/104, 105, 108, 116, 123, 125, 126, 127, 132, 134; 252/315.01; 264/86, 87, 302

[56] References Cited

U.S. PATENT DOCUMENTS

| | | | |
|---|---|---|---|
| 4,205,032 | 5/1980 | Walters et al. | 264/63 |
| 4,211,667 | 7/1980 | Yamada et al. | 252/313 R |
| 4,576,921 | 3/1986 | Lane | 501/12 |
| 4,720,302 | 1/1988 | Hutchinson | 106/121 |
| 4,845,056 | 7/1989 | Yamanis | 501/12 |
| 4,859,368 | 8/1989 | Zimmer et al. | 501/12 |
| 4,913,840 | 4/1990 | Evans et al. | 252/313.2 |
| 4,925,647 | 5/1990 | Kirchhöfer | 501/12 |

FOREIGN PATENT DOCUMENTS 1246833 12/1988 Canada.
59-195574 11/1984 Japan ................................... 501/12

*Primary Examiner*—Mark L. Bell
*Assistant Examiner*—Anthony Green
*Attorney, Agent, or Firm*—Ostrolenk, Faber, Gerb & Soffen

[57] ABSTRACT

Ceramic binder for forming and processing ceramic ware, comprising a sol-gel of a mixture of highly charged metal hydroxy cations and one or more low charged metal hydroxy cations, which are able to form an aqueous sol.

16 Claims, No Drawings

CERAMIC BINDER AND USE THEREOF

The present invention is related to a ceramic binder, and more particularly, to a ceramic binder, which enables forming and processing of large defect-free ceramic ware with complex shape.

Forming processes most commonly used in the manufacture of ceramic ware are cold forming processes, including extrusion or dry pressing and slip casting at ambient temperature.

Extrusion and dry pressing methods are commonly used, when ceramic articles with simple shapes are to be formed.

Ceramic articles with more complex shapes are formed by slip casting.

In slip casting, usually a suspension of solid particles of ceramic materials in water is poured into a porous mold of Paris plaster, wherein formation is accomplished by consolidation of the particles into a semirigid state through removal of a part of the water by rehydration of the plaster.

Drying of the cast articles represents a critical operation in the finishing of the articles. The water has to be removed carefully without introducing defects into the green ceramic caused by shrinkage during dewatering. In order to reduce cracking or distortion of the green ceramic usual drying times are in the order of 5-7 days for one centimeter thickness of the green ceramic component.

We have now found that the drying time during the preparation of advanced ceramic components can be much decreased, when using a ceramic binder comprising a sol-gel of highly charged particles and particles with a lower specific charge.

Accordingly, a broad embodiment of this invention is directed towards a ceramic binder comprising a sol-gel of a mixture of highly charged metal hydroxy cations and one or more low charged metal hydroxy cations, which are able to form an aqueous sol.

Low charged metal hydroxy cations for use in the ceramic binder are preferably chosen from the group consisting of the hydroxides of aluminum, silicon, zirconium, titanium, iron and nickel.

A particular preferred ceramic binder according to the invention comprises a sol-gel of aluminium hydroxide with the boehmite structure, mixed with highly charged aluminum tridecamer, having the general formula:

$$[AlO_4Al_{12}(OH)_{24} \cdot 20H_2O]^{7+}, 7X^-$$

where $X = Cl^-$ or $NO_3^-$

The ceramic binder according to the invention is obtained by preparing a sol of salts of the low charged metal hydroxy cations in water, which has been acidified by addition of hydrochloric acid or nitric acid to a pH-value of between 1.5 and 4;

activating the sol by heating to a temperature of between 70° C. and 100° C. at a pH-value of between 1.5 and 4, preferably of between 2-3, for 2-6 hours until a sol-gel of 3-12% by weight is obtained;

optionally filtering the sol-gel; then adding to the sol-gel an aqueous solution of salts of highly charged metal hydroxy cations containing 0.05-10 g, preferably 0.1-3 g, and most preferred 0.5-2 g of the salts per 10 g of the salts of the low charged cations in the sol-gel; and continuing heating of the sol-gel for about one hour at a pH-value of between 1.5 and 4.

When used in the forming of ceramic components by slip casting, ceramic materials comprising powders and/or fibres of refractory oxides, such as alumina, silica, chromia, zirconia, nickel oxides and the like, are dispersed in the ceramic binder in an amount of up to 90% by weight calculated on the total amount of binder and ceramic materials. Thereby, a casting slip is obtained, which can be demolded after about 30 minutes in the mold and machined after about 3 hours, when dried at temperatures of between 20° C. and 60° C. Some further drying of up to 1½ day for large samples may be preferred.

The dried green ceramic thus obtained is finally densified by conventional sintering.

As mentioned hereinbefore the drying time of green ceramics before sintering is reduced from 5-7 days as for green ceramic prepared without the ceramic binder according to the invention to about 3-36 hours by use of the ceramic binder. The actual drying time length depends upon the ceramic material used in the casting slip and the shape and size of the green ceramic.

As a further advantage of the ceramic binder according to the invention, defects in the green ceramic can be repaired by simply filling with the binder cracks or distortion in the casting slip or dried green ceramic.

The above aspects and features of this invention will become more apparent by the following Examples, illustrating specific embodiments of the invention.

EXAMPLE 1

Preparation of a ceramic binder according to the invention comprising a low charged metal hydroxy cation with the boehmite structure and aluminum tridecamer.

A boehmite sol is prepared by adding 10 g of commercial boehmite powder (Catapal D, supplied by Vista Chemical Company, U.S.A.) to a stirred beaker with 1000 ml demineralized water acidified with nitric acid to a pH-value of 2.

The prepared boehmite sol is activated by heating to 80°-90° C. for about 3-5 hours until a 6-10% by weight sol gel is obtained. During activation the pH-value of the sol is continuously adjusted to pH 2 by dropwise addition of concentrated nitric acid.

The sol-gel is then purified by filtration to remove extraneous particles.

The final binder is prepared by adding to the sol-gel 2 g of a 50% by weight solution of aluminum tridecamer (Locron S, supplied by Hoechst AG, Germany) and continuing heating for 1 hour at pH 2-3.

EXAMPLE 2

Preparation of a ceramic body by use of the ceramic binder according to the invention.

An alumina casting slip is prepared by adding alumina powder (Alcoa A 16 SG, Alcoa Company, U.S.A.) to a stirred beaker containing the boehmite binder prepared in Example 1. The alumina powder is added to the binder until a casting slip with 85% by weight of the alumina powder is obtained.

The thus prepared casting slip is poured into a mold of Paris plaster with a rectangular interior surface of 2 cm in height. The slip is demolded after about 30 minutes at room temperature, machined for holes after 3 hours, then dried for additionally 20 hours at a temperature of 50° C. The green body is subsequently sintered at 1550° C. for two hours.

The strength and toughness of the sintered ceramic body is tested in a conventional 4 point bending test and a Vickers hardness test equipped with a diamond pyramid having a tip angle of 136 degrees.

The results of the tests are summarized below.

Properties of alumina ceramic prepared in the Example:

| Strength | Fracture toughness |
|---|---|
| MPa | MPa m$\frac{1}{2}$ |
| 287 | 5 |

The corresponding value for the strength of conventionally prepared ceramic ware is about 250 MPa, with a fracture toughness of about 3 MPa m$\frac{1}{2}$ (see W. D. Kingery, Introduction to Ceramics, page 791, 2nd Edition 1976, John Wiley and Sons).

We claim:

1. Ceramic binder for forming and processing ceramic ware, comprising a sol-gel of a mixture of an aluminum tridecamer and at least one low charged metal hydroxy cation, the aluminum tridecamer and low charged metal hydroxy cation being able to form an aqueous sol, wherein the aluminum tridecamer and the low charged metal hydroxy cation are present in the binder in amounts effective for binding powders, fibers or mixtures thereof of a ceramic material.

2. The ceramic binder of claim 1, wherein the low charged metal hydroxy cations are selected from the group consisting of the hydroxides of aluminum, silicon, zirconium, titanium, iron and nickel.

3. The ceramic binder of claim 2, wherein the low charged metal hydroxy cation is aluminum hydroxide having a boehmite structure.

4. The ceramic binder of claim 1, wherein the aluminum tridecamer has the general formula:

$$[AlO_4Al_{12}(OH)_{24}\cdot 20H_2O]^{7+}, 7X^-$$

where X is Cl or $NO_3$.

5. The ceramic binder of claim 1, wherein 0.05–7 g of the aluminum tridecamer is present in the binder per 10 g of the low charged metal hydroxy cation.

6. The ceramic binder of claim 2, wherein the aluminum tridecamer has the general formula:

$$[AlO_4Al_{12}(OH)_{24}\cdot 20H_2O]^{7+}, 7X^-$$

where X is Cl or $NO_3$.

7. The ceramic binder of claim 5, wherein 0.1–3 g of the aluminum tridecamer is present in the binder per 10 g of the low charged metal hydroxy cations.

8. The ceramic binder of claim 7, wherein 0.5–2 g of the aluminum tridecamer is present in the binder per 10 g of the low charged metal hydroxy cations.

9. Process for the preparation of a ceramic binder according to claim 1, comprising the steps of preparing a sol of salts of low charged metal hydroxy cations in water, acidified with hydrochloric acid or nitric acid to a pH-value of between 1.5 and 4;
   activating the sol by heating to a temperature of between 70° C. and 100° C. at a pH-value of between 1.5 and 4, until a sol-gel with 3–13% by weight solid material is obtained;
   adding to the sol-gel an aqueous solution of salts of an aluminum tridecamer containing 0.05–7 g of the salts of an aluminum tridecamer per 10 g of the salts of the low charged metal hydroxy cations in the sol-gel; and
   continuing heating of the sol-gel for about one hour at a pH-value of between 1.5 and 4.

10. The process of claim 9, wherein the sol is acidified to a pH-value of between 2 and 3.

11. The process of claim 9, wherein the aqueous solution of salts of aluminum tridecamer contains 0.1–3 g of the salts of the aluminum tridecamer per 10 g of the salts of the low charged metal hydroxy cations in the sol-gel.

12. The process of claim 9, wherein the aqueous solution of salts of the aluminum tridecamer contains 0.5–2 g of the salts of the aluminum tridecamer per 10 g of the salts of the low charged metal hydroxy cations in the sol-gel.

13. The process of claim 9, further comprising the step of filtering the sol-gel.

14. A method for forming and processing of ceramic ware, comprising slip casting of ceramic materials comprising powders, fibers or mixtures thereof of refractory oxides using a ceramic binder comprising a sol-gel of an aluminum tridecamer and at least one low charged metal hydroxy cation, wherein the aluminum tridecamer and the low charged metal hydroxy cation are present in the binder in an amount effective for binding the powders, fibers or mixtures thereof of the ceramic material.

15. The method of claim 14, wherein the powder, fibers or mixtures thereof are dispersed in the ceramic binder in an amount of up to 90% by weight calculated on the total amount of the powder, fiber or mixtures thereof.

16. The method of claim 14, wherein the processing of ceramic ware includes reparation and gluing of green ceramic ware.

* * * * *